May 29, 1934.  G. E. PLATZER  1,961,012
MOISTURE INDICATING DEVICE
Filed Jan. 30, 1932
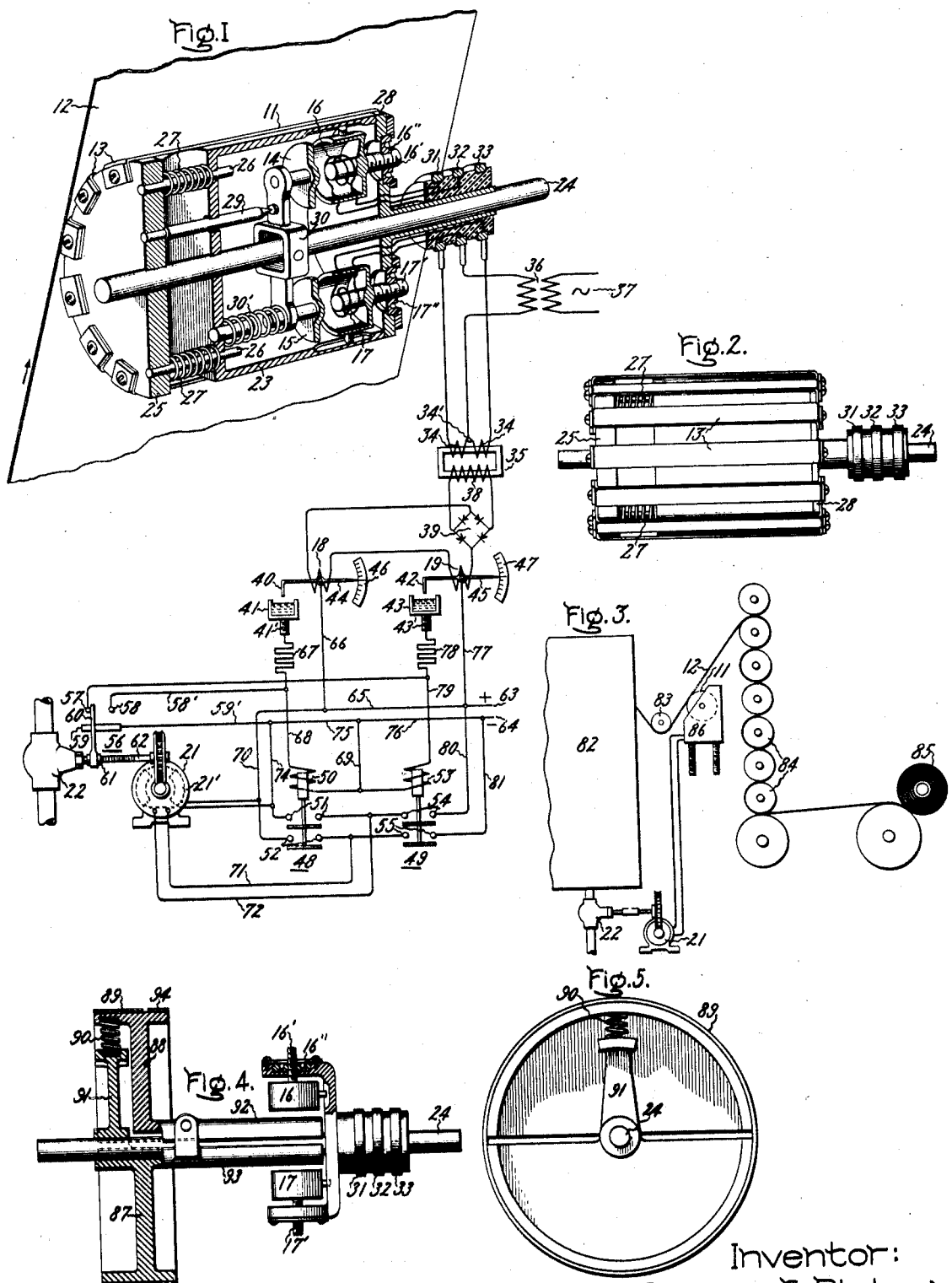
Inventor:
George E. Platzer,
by Charles E. Tullar
His Attorney.

Patented May 29, 1934

1,961,012

UNITED STATES PATENT OFFICE 1,961,012

MOISTURE INDICATING DEVICE

George E. Platzer, Schenectady, N. Y., assignor to General Electric Company, a corporation of New York Application January 30, 1932, Serial No. 589,903

10 Claims. (Cl. 177—351)

My invention relates to moisture responsive devices and particularly to devices responsive to the moisture content of a sheet of moving material. The principal object of my invention is to provide a moisture indicator and regulator in which the hygroscopic element comes in direct contact with the material being measured, thereby obtaining a rapid response to changes in moisture content. A further object of my invention is to provide an arrangement giving continuous indications of the moisture content of the portion of the material in contact with the apparatus and to provide an arrangement for immediately and automatically controlling means for correcting the moisture content.

In accordance with my invention in its preferred form I provide a revolving member carrying hygroscopic material in the form of strips, a band or other suitable form, at the periphery thereof and arranged to hold said hygroscopic material in contact with a sheet of moving material passing over the revolving member. The revolving member carries one or more variable inductances and the hygroscopic material is arranged to change in length with changes in moisture content, thereby causing variations in inductance which in turn produce variations in an electrical circuit to cause the operation of indicating devices or moisture controlling apparatus.

The features of my invention which I believe to be novel and patentable will be pointed out in the claims appended hereto. My invention itself, however, will be best understood by referring to the following description taken in connection with the accompanying drawing in which Fig. 1 represents a type of apparatus constructed in accordance with my invention; Fig. 2 is a side view of the revolving member used with the apparatus shown in Fig. 1; Fig. 3 is a schematic diagram showing the assembly of my apparatus with a portion of the apparatus used in a paper making machine; Fig. 4 is a side view partly in section of a modified form of a revolving member for use with a moisture indicator or regulator; and Fig. 5 is an end view of the member shown in Fig. 4.

Referring now more in detail to the drawing in which like reference characters refer to like parts throughout, a revolving member 11 is shown with its periphery in contact with a moving sheet of material 12. In the form of the device illustrated in Figs. 1 and 2, strips 13 of hygroscopic material, for example parchment, are attached to the revolving member 11. Changes in moisture content of the sheet 12 with which the strips 13 are in contact cause corresponding changes in the moisture content of the strips 13 with the result that these strips stretch or shrink in accordance with variations in moisture content, thereby changing the relative positions of the armatures 14 and 15 of inductance coils 16 and 17 respectively. A pair of contact making indicating instruments of any suitable construction indicated at 18 and 19 are provided which are responsive to changes in the relative inductances of coils 16 and 17 but it will be understood that a single instrument provided with suitable contacts may be used. The current responsive elements 18 and 19 may be arranged to open or close contacts to regulate a suitable device for correcting the moisture content of sheet 12 when it falls outside the limits for which the elements 18 and 19 are set. For example, the apparatus may be arranged to cause a motor 21 to operate in the proper direction to open or close a valve 22 admitting steam to a dryer used to remove moisture to the desired percentage.

The revolving member 11 comprises a cylindrical portion 23 fastened to a shaft 24 which also carries a disk 25 of the same diameter as cylinder 23 and yieldably spaced therefrom. Pins 26 are provided which permit disk 25 to slide axially along shaft 24 but cause the parts 23 and 25 to rotate together. Springs 27 are provided to maintain in tension the strips 13 which are attached at one end to the disk 25 and at the other end to the portion 28 of cylinder 23.

Motion of the disk 25 with respect to the cylindrical portion 23 caused by changes in length of strips 13 is transmitted by means of a pin 29 to a rocking lever 30 attached by means of transverse pivots to the shaft 24 and biased to a given position by spring 30'. The lever 30 carries the armatures 14 and 15 of coils 16 and 17, having inductances which vary in accordance with the positions of armatures 14 and 15. The inductances of the coils 16 and 17 may be adjusted by means of threaded portions 16' and 17' cooperating with nuts 16'' and 17'' to adjust the positions of the cores of the coils. The ends of coil 16 are connected to slip-rings 31 and 32 and the ends of coil 17 are connected to slip-rings 32 and 33 carried by shaft 24.

The coils 16 and 17 form two arms of an alternating current bridge, the other two arms of which are formed by the two halves of the primary winding 34 of a balancing transformer 35. Winding 34 is connected to brushes contacting with slip-rings 31 and 33. The bridge is energized at a suitable potential by a transformer 36 having its secondary winding connected between the slip-ring 32 and the mid-point 34' of winding 34 and having its primary winding connected to a source of alternating current 37. The transformer 35 is provided with a secondary winding 38, the ouput of which is rectified by means of a rectifier 39 of any suitable type; for example, a full-wave rectifier employing 4 oxide film elements.

A pair of current responsive instruments 18 and 19 are supplied by the rectifier 39 and so connected that the moving element of one of the instruments rotates in a counter-clockwise direction while that of the other element rotates in a clockwise direction in response to a given variation in moisture content of sheet 12. For example, instrument 18 may be arranged to deflect in the counter-clockwise direction; the instrument 19 in a clockwise direction as the moisture content of material 12 increases. The moving element of instrument 18 is provided with the contact 40 cooperating with the mercury cup 41 to close an electrical circuit when the moisture content exceeds a predetermined limit, and instrument 19 may be provided with corresponding contact 42 and mercury cup 43 to close another electrical circuit when the moisture content falls below a predetermined limit. Mercury cups 41 and 43 may if desired be provided with screw threads 41' and 43' or other suitable means for changing their positions in order to adjust the moisture limits for which the apparatus is set. Instruments 18 and 19 may also be provided with pointers 44 and 45 cooperating with scales 46 and 47 respectively, in order to provide indications of moisture content.

A pair of contactors 48 and 49 controlled by the contacts 40 and 42 respectively, of instruments 18 and 19, may be employed to start the motor 21, having a field winding 21', in the proper direction to correct for changes in moisture content. Contactor 48 comprises energizing winding 50 and two sets of contacts 51 and 52; contactor 49 comprises energizing winding 53 and two sets of contacts 54 and 55. A limit switch 56 may also be provided comprising stationary contacts 57, 58 and 59 and a sliding contact 60 carried by a portion 61 insulated from the contacting portion 60 and provided with a screw thread engaging the shaft 62 which operates the valve 22.

The operation of the apparatus is as follows: When the moisture content of the sheet 12 increases, strips 13 in contact therewith will absorb more moisture causing them to stretch and permit the springs 27 to separate the disk 25 and cylinder 23 by a greater amount. The pin 29 thereupon permits the biasing spring 30' to rotate the rocking lever 30 causing the armature 14 to be retracted from the inductance coil 16 decreasing its inductance by increasing the reluctance of its magnetic path and causing the armature 15 to approach more closely inductance coil 17 increasing its inductance by decreasing the reluctance of its magnetic path.

Inductance coils 16 and 17 are preferably so adjusted that the inductance bridge formed by the coils 16 and 17 and the two halves of the winding 34 will be balanced for a position of the armatures 14 and 15 corresponding to a point just outside the range of operation for which the apparatus is to be used. As the moisture content increases and the ratio of inductances of coils 16 and 17 varies, the degree of unbalance of the inductance bridge is changed, causing a variation in the unbalance of the currents flowing in the two halves of winding 34 of balancing transformer 35. These variations, in turn, result in variations in the current flowing in the secondary winding 38 of transformer 35 and consequently in the rectified currents flowing in instruments 18 and 19. As here described for the sake of illustration, the arrangement is such that as the moisture content of sheet 12 increases contact 40 approaches the mercury cup 41 and contact 42 of instrument 19 recedes from the mercury cup 43. When the moisture content reaches the limit for which the apparatus is set contact will be made between members 40 and 41. In a similar manner when the moisture content falls to the lower limit for which the apparatus is set the operation as described above will be reversed and contact will be made between contact 42 and mercury cup 43.

When members 40 and 41 come in contact as a result of the upper limit of moisture content having been reached, a circuit is closed from one terminal 63 of a source of direct current through conductors 65 and 66, contact 40, mercury cup 41, current limiting resistor 67, conductor 68, contactor coil 50, conductor 69, back to the other terminal 64 of the direct current supply, thereby energizing the contactor 48. When the contactor 48 is energized a circuit is closed from one terminal 63 of the direct current source through conductor 65, conductor 70, contacts 52, conductor 71, suitable windings, not shown, such as the armature windings of the motor 21, conductor 72, contacts 51, and conductors 74, 75, and 76, back to the other terminal 64 of the direct current source. The motor 21 continues in operation opening the valve 22 to admit more steam to a drier until the moisture content falls below the upper limit separating the contacts 40 and 41 which deenergizes the contactor 48 and stops the motor 21.

When the moisture content falls below the lower limit so as to cause contact to be made between contact 42 and mercury cup 43 a circuit is closed from terminal 63 through conductor 77, contacts 42 and 43, current limiting resistor 78, conductor 79, contactor winding 53, conductors 69 and 76, back to terminal 64. Thereupon contactor 49 is energized closing a circuit from terminal 63 through conductor 80, contacts 54, conductor 72, armature winding of motor 21, conductor 71, contact 55, conductor 81, back to terminal 64. In this case the current traverses the armature winding of the motor 21 in the opposite direction and the motor rotates in a direction opposite to that produced by closing contactor 48.

The limit switch 56 is so arranged that when valve 22 has been fully opened contact is made between sliding contact 60 and stationary contact 58, thereby short-circuiting winding 50 of contactor 48 by a circuit comprising conductors 69, 75 and 59', contacts 59, 60, and 58, and conductor 58'. Consequently, contactor 48 opens and the valve motor 21 stops. In like manner when the valve 22 has been fully closed winding 53 of contactor 49 is short-circuited by means of contacts 57 and 60.

Although I have shown apparatus for use in making moisture determinations of moving sheets, it will be understood that my invention is not limited thereto but obviously includes other types of apparatus in which hygrometric material expansible with moisture is brought into contact with a substance the moisture content of which is to be determined, or is otherwise subjected to the influence of the moisture in the substance.

Owing to its rapidity of response, however, my apparatus is particularly advantageous for use in connection with moisture determinations of substances produced by continuous processes in the form of a sheet, or thread.

It will be understood that my moisture responsive apparatus may be used either as an indicating device or in combination with any suitable type of moisture controlling apparatus. For example, in Fig. 3 I have shown an arrangement in which the valve 22 is utilized to regulate the amount of steam flowing into the drier 82 used in connection with paper making machinery. The sheet of paper 12 leaves the drier 82 running under a guide roller 83 over the revolving member 11 of the moisture responsive apparatus and between a series of polishing and finishing rolls 84 from which the sheet passes to the reel 85.

Preferably the moisture responsive apparatus is enclosed by a box 86 having an aperture through which a portion of the revolving member 11 is permitted to extend in order to come in contact with the moving sheet 12. In this way the hygroscopic material carried by revolving member 11 is made more closely responsive to the moisture content of sheet 12 and the effect of variations in atmospheric humidity is minimized. In order to calibrate the apparatus the moisture indicator may be placed within a chamber in which the atmospheric humidity may be varied and given suitable known values.

Although I have shown an arrangement in which the hygroscopic material is used in the form of strips permitted to stretch or shrink longitudinally with respect to a revolving member, it will be understood that my invention is not limited to this exact arrangement. Many modifications falling within the scope of my invention will suggest themselves to those skilled in the art. For example, I may employ the arrangement shown in Figs. 4 and 5 in which a revolving member takes the form of a split disk having portions 87 and 88 and a band of hygroscopic material 89, the length of which varies in response to variations in moisture content and surrounds the split disk. A spring 90 supported by an arm 91 serves to expand the disk and maintain the band 89 under a tension at all times. The revolving member is also provided with portions 92 and 93 attached to disk portions 87 and 88 and forming armatures for the inductance coils 16 and 17 which serve the same purpose as those shown in Fig. 1. The members formed by portions 88 and 92 rock about a pivot transversely with respect to shaft 24 and the variations in moisture causing variations in length of band 89 cause armature 92 to move with respect to coil 16, thereby causing the relative inductances of inductance coils 16 and 17 to vary.

In order to prevent slippage of the revolving member as the moving sheet of material passes under its circumference and in order to reduce the wear of the hygroscopic band 89 I may provide an additional band 94 of rubber or other suitable material which supplies the slight amount of frictional tangential force required to rotate the revolving member. The thicknesses of bands 89 and 94 may if desired be made to differ a slight amount without resulting in the removal of band 89 from direct contact with the moving sheet 12.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. Apparatus responsive to the moisture content of moving material which comprises a revolving member, hygroscopic material yieldably mounted thereon to permit change in dimension with change in moisture content and brought into contact with said moving material by said revolving member and means actuated by changes in dimension of said hygroscopic material to provide a response dependent upon moisture content.

2. Apparatus responsive to the moisture content of moving material which comprises a revolving member, hygroscopic material yieldably mounted thereon to permit said hygroscopic material to change in dimension with change in moisture content, said hygroscopic material being brought into contact with said moving material by said revolving member, a variable inductance coil, means for varying the inductance of said coil in response to changes in dimension of said hygroscopic material and electrical means associated with and responsive to variations in said inductance.

3. Apparatus responsive to the moisture content of moving material which comprises a revolving member, hygroscopic material carried in proximity to and with said moving material by said revolving member and yieldably mounted thereon to permit said hygroscopic material to change in dimension with change in moisture content, a variable inductance, means for varying said inductance in response to changes in dimension of said hygroscopic material, and electrical means associated with and responsive to variations in said inductance.

4. Apparatus responsive to the moisture content of moving material which comprises a revolving member, hygroscopic material yieldably mounted thereon to permit change in dimension with change in moisture content and brought into contact with said moving material by said revolving member, a pair of relatively variable inductance coils, an alternating-current bridge having two of its arms formed by said relatively variable inductance coils and an electrical device responsive to unbalance in said alternating-current bridge providing a response dependent upon the moisture content of said moving material.

5. Apparatus responsive to the moisture content of moving material which comprises a revolving member, strips of hygroscopic material having one end attached to a portion of said revolving member and having the other end yieldably mounted upon another portion of said revolving member to permit said yielding end to vary in position with variations in moisture content, said strips of hygroscopic material being brought into contact with said moving material by said revolving member, and a device actuated by motion of the yieldable end of said hygroscopic material, thereby providing a response dependent upon moisture content of said moving material.

6. Apparatus responsive to the moisture content of a sheet of moving material comprising a revolving member in the form of a disk split along a diameter into two relatively movable portions, a band of hygroscopic material surrounding the circumference of said revolving disk member and having a portion thereof held in contact with said moving material by said revolving member, a pair of inductance coils one of which has an armature the position of which changes in response to relative motion between the split portions of said disk, and an electrical device responsive to variations in the relative inductances of said coils to provide a response dependent upon the moisture content of said moving material.

7. Apparatus responsive to the moisture content of a sheet of moving material comprising a revolving member in the form of a disc split along a diameter into two relatively movable portions biased to separated positions, a band of hygroscopic expansible material surrounding the circumference of said revolving disc member tending to hold the portions of said disk together and being held in contact with said moving material by said revolving member, and a device actuated by relative motion between the portions of said disc, thereby providing a response dependent upon the moisture content of said moving material.

8. Apparatus responsive to the moisture content of moving material which comprises a revolving member hygroscopic material yieldably mounted thereon to permit change in dimension with change in moisture content and brought into contact with said moving material by said revolving member, a variable inductance coil, means for varying the inductance of said coil in response to variations in dimension of said hygroscopic material, and an electrical device responsive to variations in said inductance to provide a response dependent upon moisture content.

9. A hygrometric device comprising a hygrometric element undergoing a physical deformation with change of moisture content, means for bringing said element in direct contact with a moving material for a sufficient time to produce a moisture content therein substantially proportional to that of such material, and means for indicating the resultant deformation.

10. A moisture responsive device for determining the moisture content of moving material, comprising in combination with such moving material, a hygroscopic expansible element having a portion intermittently in direct contact and moving with said material, and means responsive to the expansion and contraction of said hygroscopic element due to changes in the moisture content of the material with which it contacts.

GEORGE E. PLATZER.